United States Patent [19]

Lemche et al.

[11] Patent Number: 5,727,187
[45] Date of Patent: Mar. 10, 1998

[54] METHOD OF USING LOGICAL NAMES IN POST-SYNTHESIS ELECTRONIC DESIGN AUTOMATION SYSTEMS

[75] Inventors: Carol L. Lemche, East Bethel, Minn.; Harold E. Reindel, Essex Junction, Vt.

[73] Assignee: Unisys Corporation, Blue Bell, Pa.

[21] Appl. No.: 521,697

[22] Filed: Aug. 31, 1995

[51] Int. Cl.$^6$ ........................................... G06F 17/16
[52] U.S. Cl. ........................... 395/500; 364/578
[58] Field of Search ............... 395/500; 364/488–491, 364/578

[56] References Cited

U.S. PATENT DOCUMENTS

| | | | |
|---|---|---|---|
| 5,210,699 | 5/1993 | Harrington | 364/488 |
| 5,222,030 | 6/1993 | Dangelo et al. | 364/489 |
| 5,239,493 | 8/1993 | Sherman | 364/578 |
| 5,539,680 | 7/1996 | Palnitkar et al. | 364/578 |

OTHER PUBLICATIONS

P.D. Noakes—"An introduction to testing and design for test techniques," Design and Test Techniques for VLSI and WSI Circuits R.E. Massara,ed., Ltd., 1989, pp. 124–144.

R.E. Massara, Ed. "Gate–array technology and design," Design and Test Techniques for VLSI and WSI Circuits, Ltd., 1989, pp. 14–58.

J.D. Touge, Testing Gate Arrays, Design and Test Techniques for VLSI and WSI Circuits, R.E. Massara, 1989, pp. 247–285.

Graham Hetherington, Computer Aided Design for Logic Arrays, Design and Test Techniques for VLSI and WSI Circuits, R.E. Massara, 1989, pp. 212–221.

Computer Design's ASIC Design, Special Report: Sumicron ASIC designers scream for synthesis–to–layout links, Dec., 1993, pp. A20–A26.

Ray Weiss, EDN–Special Report: Probing the limits of Logic Synthesis, EDN Mar. 17, 1994, pp. 50–62.

John Novellino, Technological Analysis: Software Targets Test Bottleneck . . . , Electronic Design, Nov. 7, 1994, pp. 63–68.

Bob Wiederhold, Design Feature: Deep–submicron ASIC design requires design planning, EDN Feb. 16, 1995, pp. 95–100.

Goering, VHDL's Missing Link: The Gate Level, Electronic Engineering Times, Jan. 6, 1992.

Cho et al., An Accurate AC Characteristic Table Look–up Model for VLSI Analog Circuit Simulation Applications, IEEE, pp. 1531–1534, Jun. 1993.

Cheng et al., A Fast Method for MOS Model Evaluation in VLSI Simulation with Controllable Error, IEEE, pp.200–203, 1991.

Karathanasis et al., Fast VLSI Implementations for MRF and ANN Applications, IEEE, pp.460–464, Jun. 1993.

*Primary Examiner*—Kevin J. Teska
*Assistant Examiner*—Matthew Loppnow
*Attorney, Agent, or Firm*—Charles A. Johnson; Mark T. Starr

[57] ABSTRACT

A method used by an electronic design automation system for allowing the use of logical names from a register transfer level description of an integrated circuit design in timing notes and simulation tests written for timing analysis and simulation programs. A synthesis program generates a state map file containing an entry for the logical name for each state defined in the register transfer level description of the integrated circuit. The gate level name generated by the synthesis program corresponding to the logical state name is stored in the entry providing a one to one mapping of a logical state name to a gate level state name. The state map file is input to timing analysis and simulation programs wherein references to the logical state names in timing notes and simulation tests are translated to gate level state names before further processing.

13 Claims, 4 Drawing Sheets

METHOD OF USING LOGICAL NAMES IN POST-SYNTHESIS ELECTRONIC DESIGN AUTOMATION SYSTEMS

BACKGROUND OF THE INVENTION

1. Field of the Invention

This invention relates generally to electronic design automation (EDA) systems used for designing integrated circuits. The invention is more specifically related to a method of using EDA synthesis, timing analysis, and simulation tools.

2. Background Information

The design process for all integrated circuits is composed of several discrete operations. Initially, the proposed functionality for a circuit is analyzed by one or more chip designers. These designers define the logical components of the circuit and their interactions by specifying the logic design using design capture tools. These design capture tools are commonly implemented in software executing on an engineering workstation, with well-known input devices being used to receive design information from the chip designer and output devices, such as computer displays, being used to provide visual feedback of the design to the designer as it is being constructed. Such software is typically implemented as part of an electronic design automation system. Specifically, the design entry operation involves generating a description of the logic design to be implemented on the circuit chip in an appropriate machine-readable form. Chip designers generally employ hierarchical design techniques to determine the appropriate selection and interconnection of logic and/or memory devices which will enable the chip to perform the desired function. These techniques involve describing the chip's functionality at various levels of abstraction, ranging from the most general function performed by the chip to the precise functions performed by each logic and/or memory element on the chip.

The hierarchy of a logic design consists of "N" levels of functions, where N is an integer (N>=1) representing the number of hierarchical levels of functionality in the chip, the first level being the chip itself, and where "n" is an integer (1<=n<=N) representing the level of any particular function in the hierarchy. A function consists of a discrete logic and/or memory element, or any combination of such elements. It may be as simple as an inverter or a flip-flop, consisting of one or only a few transistors, or as complex as a shift register, an arithmetic logic unit (ALU), or even a microprocessor. A parent function at the (n)th level of the hierarchy is defined as a plurality of (n+1)st level functions, each of which is a child function. For example, a microprocessor at the (n)th level might be defined as the parent of the following (n+1)st level children: an ALU, a series of registers, a bus, and various other functions (each of which may or may not have a plurality of (n+2)d level children, and so on). Each child function which is not also a parent function (i.e., which has no children) is referred to as a leaf function or cell. Each function and cell in the design are given unique names.

The concept of the hierarchy of containment described above is orthogonal to the concept of logic interconnection nets. Each leaf cell in a design is connected to at least one other leaf cell, such connection being commonly referred to as a "net." The set of nets, each of which defines a plurality of interconnected functions, is commonly referred to as a "netlist." Each net in the netlist is given a unique name to distinguish it from all other nets.

Two common methods for specifying the design are schematic capture and hardware description languages. Both of these methods allow a circuit designer to specify the circuit at the register transfer level (also known as a "behavior description"). The schematic capture method provides a sophisticated user interface which allows a logic circuit to be drawn in graphical form on a computer display. The design is often specified with standard logic symbols such as NAND gates and NOR gates. Using this method, the circuit is defined in small building blocks. The names of the building blocks are specified by the circuit designer. Thus, they usually are logical names with specific functional meaning.

Encoding the design in a hardware description language (HDL) is the other major design entry technique used to specify modern integrated circuits. Hardware description languages are specially developed to aid a designer in describing a circuit. These languages often contain specific functions and syntax to allow complex hardware structures to be described in a compact and efficient way. The HDL program specifying the design may be compiled into the same data format produced by schematic capture, thereby providing a designer great flexibility in methods used for specifying a logic design. The design concepts of libraries, cells, hierarchies, interconnects, etc., discussed above in regard to design by schematic capture are equally applicable to designs specified by a HDL.

It is useful to distinguish between those cells provided by the chip vendor as primitive cells (i.e., leaf candidates) and the user-defined hierarchy blocks built upon them. One way is to speak of a "cell library" vs. a "design library" as two separate libraries, both of which are available to subsequent designs. Alternatively, at least initially, a design library contains a standard cell library. A cell library is a database containing detailed specifications on the characteristics of each logical component available for use in a design. Initial cell library contents are usually provided by the chip vendor. The components in the cell library are identified by the generic description of the component type. For example, the term "NAND" for a NAND gate is its type description and distinguishes this component from others such as OR gates, flip-flops, multiplexors, and so on. A two-input NAND gate might be of type 2NAND. When a particular 2NAND component is specified as part of a given circuit design, it is given an instance name, to distinguish it from all other 2NAND gates used in the circuit. The instance name typically includes the instance names of all parent instances by concatenation when defining the instance in the context of the chip. A single name is sufficient when dealing only in the context of a single user function. The user-defined blocks can then be used to design larger blocks of greater complexity. The user-defined blocks are added to the design library, which grows from the additions of new design modules as the design evolves. The top level of the design hierarchy will be a single block that defines the entire design, and the bottom layer of the hierarchy will consist of leaf cells, the cells (i.e., the logical components) that were originally provided in the cell library. Note that the hierarchy is typically structured as a special kind of a graph called a tree. This resulting data structure is called a detailed (or gate-level) description of the logic design. The generation of the detailed description is accomplished by logic design synthesis software.

The output of the design capture and synthesis tools is a logic design database which completely specifies the logical and functional relationships among the components of the design. Once the design has been converted into this form, it is necessary to verify that the logic definition is correct and that the circuit implements the function expected by the designer. This verification is currently achieved by timing and simulation tools. The design undergoes design verification analysis in order to detect flaws in the design. The design is also analyzed by simulating the device resulting from the design to assess the functionality of the design. If errors are found or the resulting functionality is unacceptable, the designer modifies the design as needed. These design iterations help to ensure that the design satisfies its requirements.

After timing verifications and functional simulation has been completed on the design, placement and routing of the design's components is performed. These steps involve allocating components of the design to locations on the integrated circuit chip and interconnecting the components.

During post-layout verification, the operation of the logic design is examined. The post-layout tools extract the lengths of the connection paths between logic blocks and inserts appropriate resistances and capacitances into the circuit model to give a more accurate description of the actual circuit in the time domain. The post-layout verification of the design validates time-critical areas and detects glitches and other timing errors. After post-layout verification, masks and test patterns are automatically generated for use in manufacturing and testing the circuit.

A major problem that arises during the design process described above is that the logical names specified by the circuit designer in the design capture step are automatically translated by the design synthesis tools into complex gate-level names. As a result, test engineers have difficulty writing timing notes for the timing verification tools and simulation tests for the simulation tools because of the complexity of the names. It is difficult to correlate the gate-level names, assigned by the design synthesis tools in a vendor-specific fashion, to the original logical names. More importantly, since many of the steps in the design process are iterative, small changes in the behavior description of the design made as a result of finding errors during timing verification and simulation cause the design synthesis tools, upon their subsequent execution, to generate completely new gate-level names for the entire design. The test engineers must then completely rewrite the timing notes and simulation tests because of the new gate-level names. This task must be done for every iteration through the design and test cycle. In many cases, the number of design iterations is hundreds of times through the design and test cycle. One skilled in the art can readily see that this situation may cause a substantial increase in the time needed for integrated circuits to be designed and tested. For current integrated circuit designs having hundreds of thousands of gates, this situation is unacceptable. The elimination of this unnecessary step in the integrated circuit design process is the goal of the present invention.

SUMMARY OF THE INVENTION

An object of this invention is to decrease the time required for the integrated circuit design and test cycle using electronic design automation systems.

Another object of this invention is to allow a test engineer to write timing notes and simulation tests for the verification and simulation of integrated circuit designs in register transfer level format rather than gate level format.

Yet another object of this invention is to minimize the time spent by test engineers re-writing timing notes and simulation tests during the integrated circuit design and test cycle.

A further object of this invention is to allow timing and simulation tools access to the register transfer level names of an integrated circuit design.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the Drawings and Description of the Preferred Embodiment, with the scope and aspects of the invention defined in the appended claims.

According to the present invention, the foregoing and other objects and advantages are attained by a novel method for allowing the use of logical names from the register transfer level description of an integrated circuit design in timing notes and simulation tests used in a electronic design automation system. The electronic design automation system for designing an integrated circuit includes a register transfer level description of the integrated circuit design as specified by a circuit designer through the use of a design capture program. The register transfer level description references logical state names for the integrated circuit's components. A synthesis program is included for taking as input the register transfer level description and generating a gate level description of the integrated circuit design. The gate level description references gate level names for the integrated circuit's components. Also included are testing programs such as a post-synthesis timing program for analyzing the timing of the integrated circuit design. The timing program utilizes a set of timing notes written by a test engineer to direct the timing analysis. Finally, another testing program called a post-synthesis simulation program is included to simulate the performance of the integrated circuit. The simulation program utilizes a set of simulation tests written by a test engineer to control the simulation.

The method begins with the step of creating a state map file for storing the relationship between the logical state names of state elements specified in the register transfer level description of the integrated circuit design and the gate level names of these state elements specified in the gate level description of the integrated circuit design. Next, an entry is created in the state map file for each logical state name specified in the register transfer level description. As the circuit design is synthesized, a newly created gate level name specified by the gate level description of the integrated circuit design and corresponding to a logical state element name specified in the register transfer level description is stored into the entry. The entry creation and storage steps are repeated for all logical state names in the register transfer level description. After the state map file is complete, it is input to timing and simulation programs. These programs automatically translate references to logical state names in the timing notes and simulation tests into corresponding gate level names by searching the state map file to locate the appropriate entries representing the logical state names and returning the gate level names stored in the identified entries. In this manner, test engineers avoid having to manage the complex gate level names when writing and modifying timing notes and simulation tests.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

DESCRIPTION OF THE PREFERRED EMBODIMENT

Figure 1:
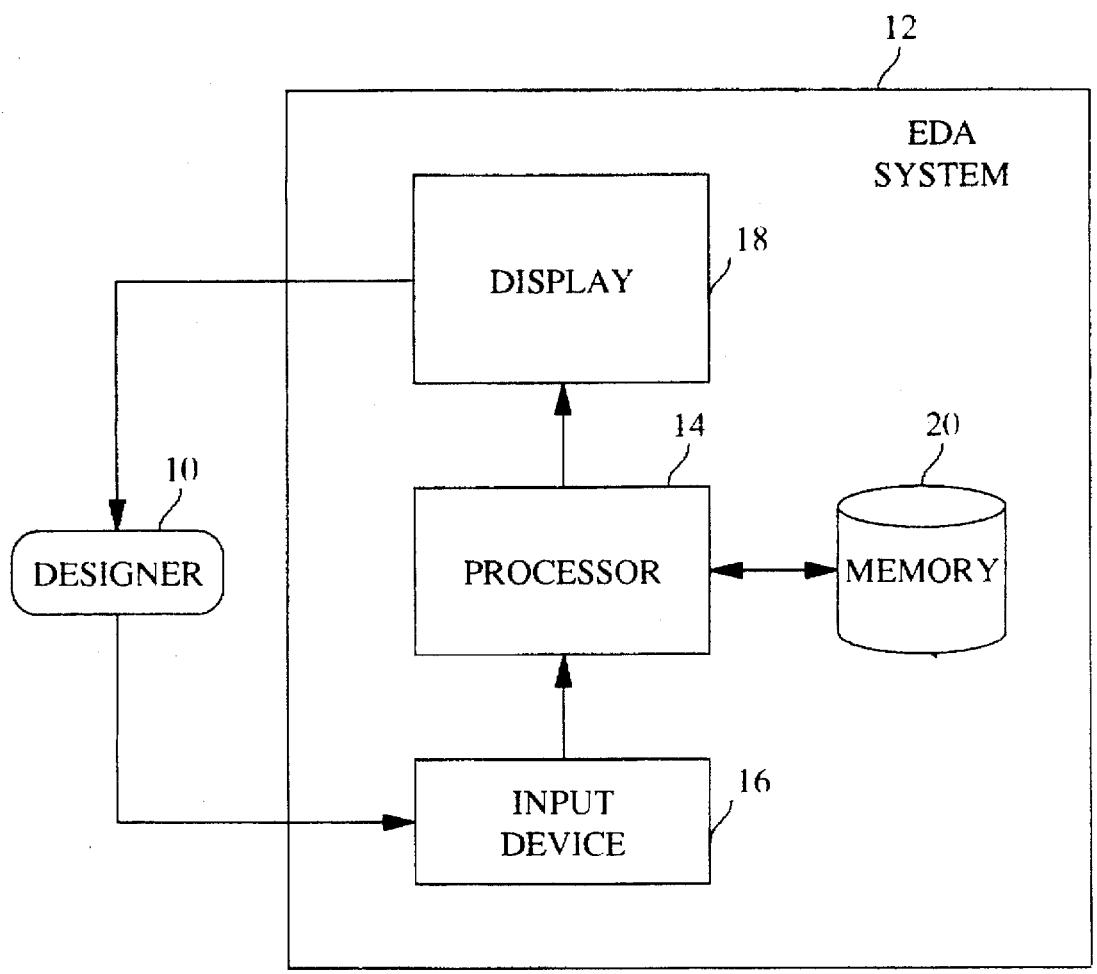
FIG. 1 is a block diagram of the computer-based environment of the present invention.

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method of operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer system or other apparatus. In particular, various general purpose computer systems may be used with computer programs written in accordance with the teachings of the present invention, or it may prove more convenient to construct more specialized apparatus, to perform the required method steps. The required structure for such machines will be apparent from the description given below.

In sum, the present invention preferably is implemented for practice by a computer, e.g., a source code expression of the present invention is input to the computer to control operations therein. It is contemplated that a number of source code expressions, in one of many computer languages, could be utilized to implement the present invention. A variety of computer systems can be used to practice the present invention, including, for example, a personal computer, an engineering work station, an enterprise server, etc. The present invention, however, is not limited to practice on any one particular computer system, and the selection of a particular computer system can be made for many reasons.

FIG. 1 is a block diagram of the computer-based environment of the present invention. A Designer 10 interacts with an electronic design automation (EDA) System 12 to enter an integrated circuit design, validate the design, place the design's components on a chip, and route the interconnections among the components. The integrated circuit may be an application specific integrated circuit (ASIC). The EDA System 12 includes a Processor 14, which executes operating system software as well as application programs known as EDA software. The Processor is found in all general purpose computers and almost all special purpose computers. The EDA System 12 is intended to be representative of a category of data processors suitable for supporting EDA operations. In the preferred embodiment, the EDA System is a HP A1097C Series 700 engineering workstation, commercially available from Hewlett-Packard Corporation, although other engineering workstations or computer systems from manufacturers such as Sun Microsystems, Inc., may also be used. The Designer 10 enters design information into the EDA System by using a well-known Input Device 16 such as a mouse, a keyboard, or a combination of the two devices. It should be understood, however, that the Input Device may actually consist of a card reader, magnetic or paper tape reader, or other well-known input device (including another computer system). A mouse or other cursor control device is typically used as an Input Device as a convenient means to input information to the EDA System to select command modes, edit input data, and the like. Visual feedback of the design process is given to the Designer by showing the design being constructed as graphical symbols on Display 18. The Display is used to display messages and symbols to the Designer. Such a Display 18 may take the form of any of several well-known varieties of CRT displays. The EDA software being executed by the Processor 14 stores information relating to the logic design in Memory 20. The Memory may take the form of a semiconductor memory, magnetic disks, optical disks, magnetic tape or other mass storage device.

Figure 2:
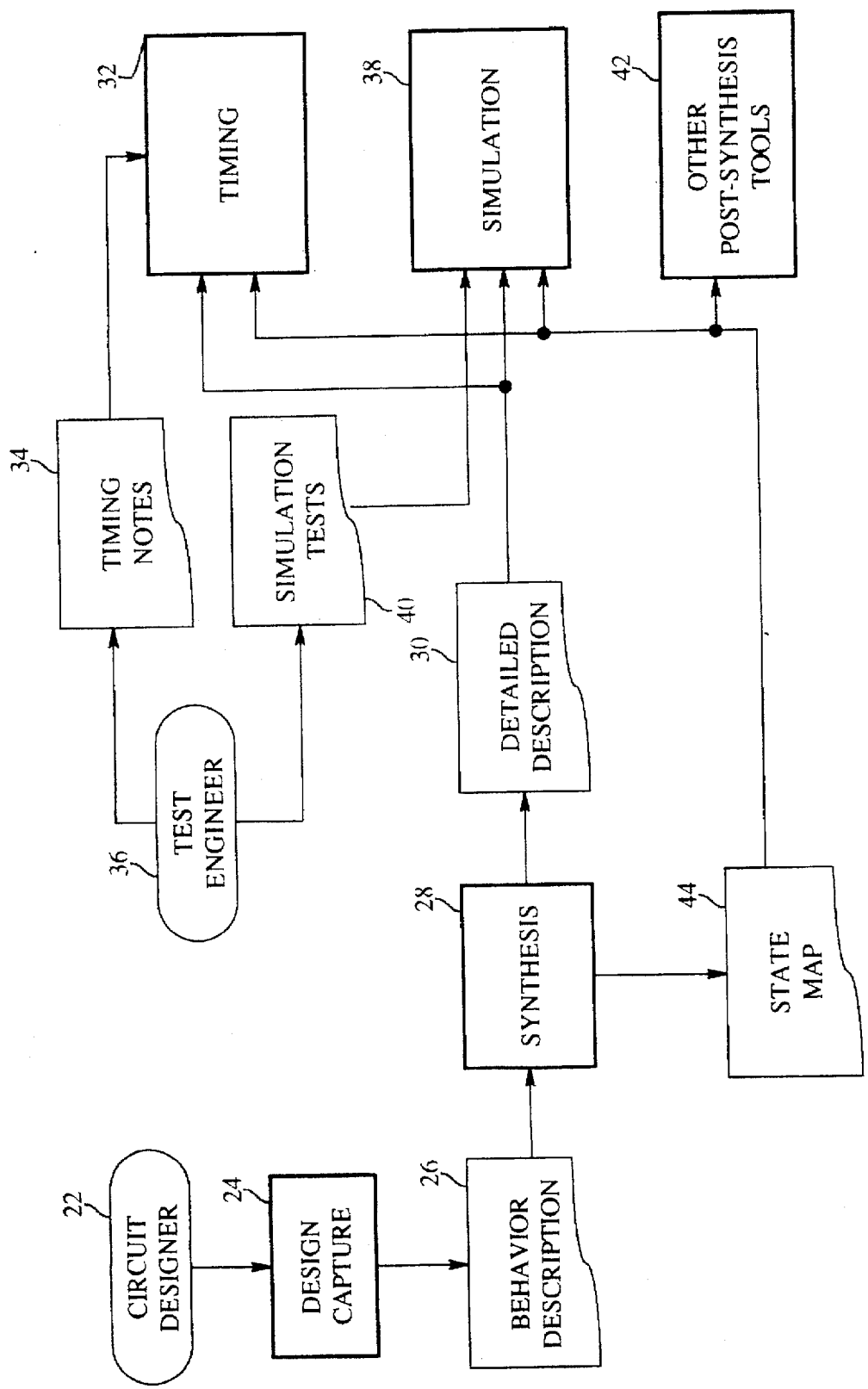
FIG. 2 is a block diagram of the process environment of the present invention.

FIG. 2 is a block diagram of the process environment of the present invention. The Circuit Designer 22 specifies the logic design of an integrated circuit by using Design Capture software 24. In the preferred embodiment, the Hardware Computer-Aided Design System (HCADS), available from Unisys Corporation, is used as Design Capture software 24, although other design capture programs from companies such as Cadence Design Systems, Inc. Synopsys, Inc., and Mentor Graphics, Inc., are also commercially available. The result of this activity is a Behavior Description file 26. The Behavior Description represents the logic design as specified at the register transfer level. Items in the Behavior Description file map to functional components of the design. Each component has a logical state name assigned to it by the Circuit Designer 22. The Behavior Description is input to Synthesis software 28. Synthesis software 28 creates the gates and other circuitry needed to implement the design specified by the Behavior Description. In the preferred embodiment, the Synthesis software comprises the Behavior to Structure Translator (BEST) synthesis tool developed by Unisys Corporation. However, alternate embodiments such as the VHDL Design Compiler commercially available from Synopsys, Inc., the DesignBook synthesis tool from Escalade, and the Synergy synthesis tool available from Cadence Design Systems, Inc., may also be used. The Synthesis software 28 generates the Detailed Description file 30. This file contains the gate-level definition of the logic design.

The Detailed Description file 30 is input to a variety of other EDA software programs. The Detailed Description is sometimes referred to as the netlist for the design. Timing software 32 performs timing analysis on the logic design as directed by the Timing Notes 34 written by a Test Engineer 36. Ordinarily, the Timing Notes 34 reference the gate level state names (assigned by the Synthesis tool 28) contained in the Detailed Description 30. Similarly, Simulation software 38 uses Simulation Tests 40 written by the Test Engineer 36 to control the simulation of the logic design. The Simulation Tests 40 also ordinarily reference the gate level state names contained in the Detailed Description 30. For example, a Test Engineer is forced to refer to a latched signal as "A.B.C.D.E", with that name describing the implementation of the latch within the logic design. Other Post-Synthesis Tools 42 may also need to access the output of the Synthesis software 28 in order to perform functions such as further design verification, placement, layout, and the like. Timing Notes 34 and Simulation Tests 40 are examples of control files used to control post-synthesis tools. Other control files (not shown in FIG. 2) could be used to control Other Post-Synthesis Tools 42. Simulation and timing analysis must be performed on the gate-level implementation, not the logical design because the drive and fanout of the integrated circuit design will affect the timing analysis, and, if incorrectly inserted, could affect functional results. Therefore, the Detailed Description must be provided to the Timing and Simulation tools.

Requiring Test Engineers to furnish Detailed Description references is undesirable for several reasons. First, this method is error-prone, since the Test Engineers have to cross-reference the register transfer level behavior with the results of Synthesis processing while they are writing Timing Notes and Simulation Tests. Second, every time the detailed implementation of the design is changed (which may happen hundreds of times during the course of debugging a complex logic design), the Timing Notes and Simulation Tests must be revised with the new descriptions. In addition, each iteration may result in completely new gate level state names for the design. Finally, Timing Notes and Simulation Tests cannot be easily deciphered, because the description is full of program-generated names with no bearing on the actual functionality of the design.

The improvement to the existing process embodied in the EDA System described above solves these problems by using a new electronic file called the State Map 44. The State Map 44 contains a mapping of the user-friendly register transfer level name of a state in the logic design with the gate level description of a latched logic state assigned by the Synthesis tool 28. Thus, a mapping of states in the Behavior Description to the Detailed Description is kept by the EDA System in order to facilitate the use of Behavior Description information with post-synthesis tools. The State Map is an American Standards Committee on Information Interchange coded (ASCII) text file. At the time Synthesis software 28 generates an entry for the Detailed Description file 30, the Synthesis software knows which entry in the Behavior Description is currently being processed. Synthesis software then creates a new entry in the State Map file representing the register transfer level to gate level mapping. In some situations, each portion of an application specific integrated circuit (ASIC) could have its own State Map file. The State Map file is sorted by register transfer level (RTL) name so future accesses to the file may be performed efficiently. The State Map is then input to the Timing software 32, Simulation software 38, and optionally Other Post-Synthesis Tools 42. Each of these post-synthesis programs read both the Detailed Description file 30 and the State Map file 44. The Timing software 32 reads entries in the Timing Notes 34 written in register transfer level form and searches the State Map file 44 for the corresponding gate level entries. For example, the Test Engineer may now reference the logical name "H_CLOCK1" instead of "A.B.C.D.E" to describe a latched signal. This capability is especially useful when a Test Engineer is describing a vectored net, since a name like "H_ADRS[15-0]" can be used instead of having to describe 16 different latched signals physically scattered throughout a section of the logic design. Most advantageously, the Test Engineer no longer has to be aware of the actual gate level implementation of the logic design.

In the preferred embodiment, the well-known binary search is used to reference the State Map entries, although other search strategies or algorithms could easily be used. Timing software 32 then performs the timing verifications as directed by the Timing Notes. Simulation software 38 reads the Simulation Tests 40 which reference components of the logic design written in register transfer level form and searches the State Map file 44 for the component's corresponding gate level names. One skilled in the programming art readily understands how to modify Timing and Simulation software to read textual data out of a text file and substitute one text string for another.

When the Behavior Description 26 is modified, perhaps due to an error uncovered by the Timing 32 or Simulation 38 software tests, the modified Behavior Description is again input to the Synthesis software 28 to generate a new Detailed Description 30 and new State Map 44. Despite the fact that an entirely new Detailed Description file has been generated, with gate level names completely different than the previously generated names, substantial portions of the Timing Notes 34 and Simulation Tests 40 are still valid. A minimal amount of effort would now be expended by the Test Engineer 36 to modify the Timing Notes 34 and Simulation Tests 40 to reflect the changes made to the Behavior Description 26. However, as a result of the present invention, there is no need to completely rewrite the Timing Notes and Simulation Tests. Design modification can be completed more rapidly and with fewer errors than without the present invention.

Figure 3:
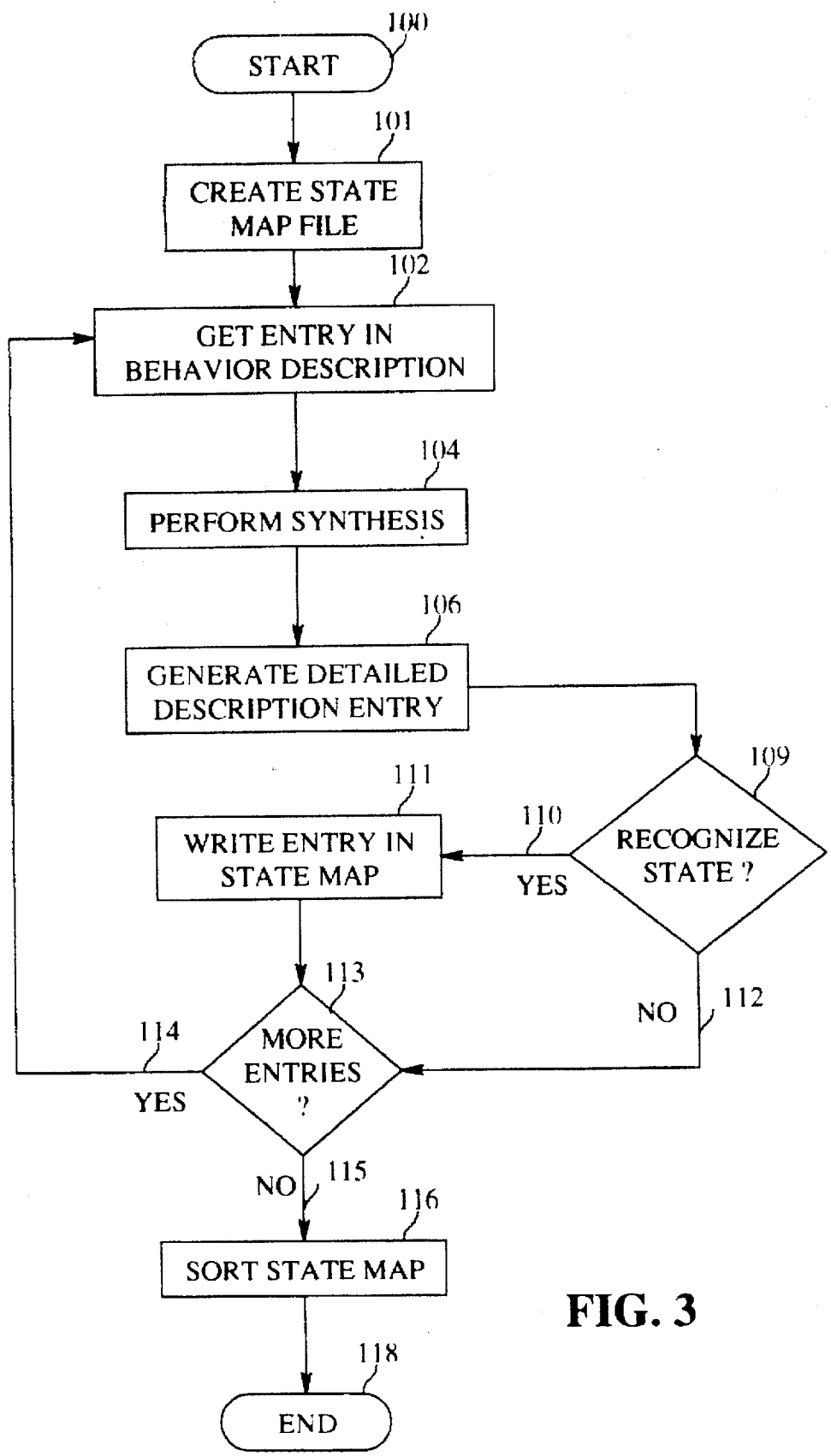
FIG. 3 is a flowchart of the steps taken by Synthesis processing to generate a State Map.

FIG. 3 is a flowchart of the steps taken by Synthesis processing to generate a State Map. After Start Step 100, Synthesis processing creates a State Map file at Step 101. It then obtains a state entry in the Behavior Description at Step 102. At Step 104, logic design synthesis is performed. Next, at Step 106, an entry in the Detailed Description is generated as a result of the synthesis activity based on the Behavior Description. If, at test Step 109, a state is recognized, then Yes path 110 us taken to Step 111. At Step 111, an entry is written into the State Map for the Behavior Description state entry/Detailed Description entry combination. If a state is not recognized at Test Step 109, then No path 112 is taken to Test Step 113. If there are more entries in the Behavior Description to process at Test Step 113, then Yes path 114 is taken back to Step 102 for processing of more Behavior Description entries. If not, No path 115 is taken to Step 116. At this Step the State Map is sorted so future accesses may be performed efficiently. Processing ends at End Step 118. If any changes are made to the Behavior Description, this process is repeated.

Figure 4:
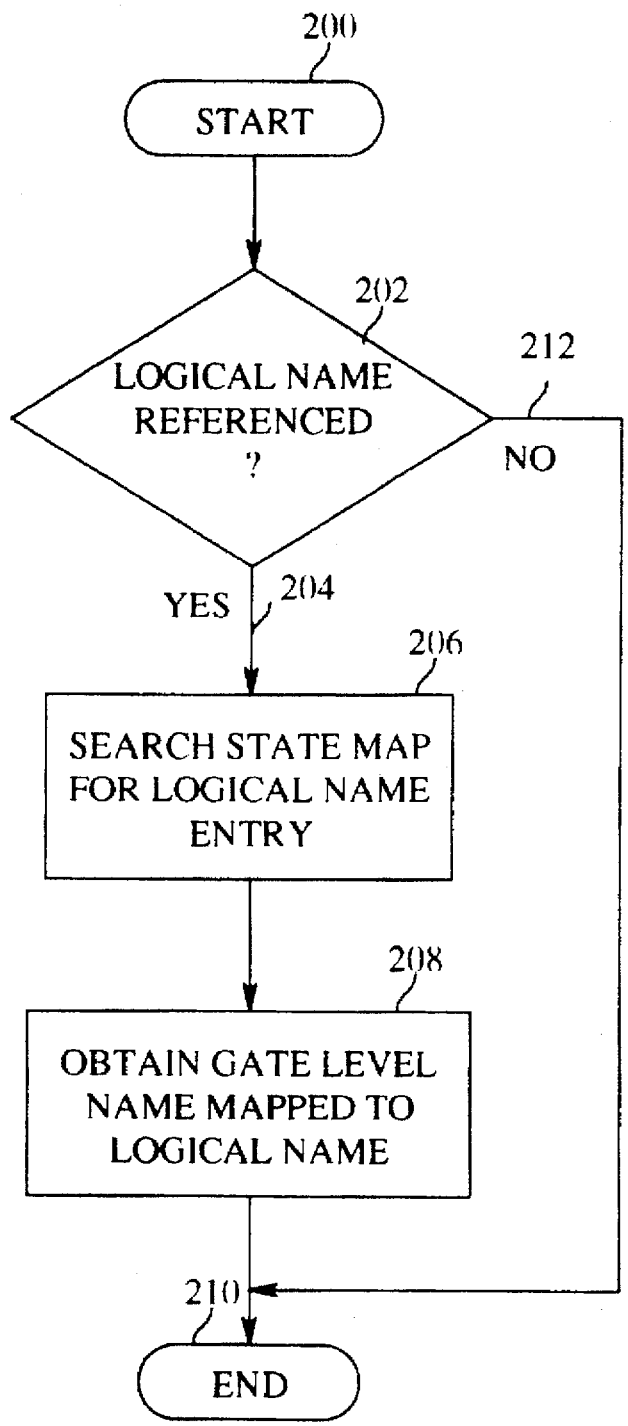
FIG. 4 is a flowchart of the steps taken by Timing and Simulation processing to obtain a gate level name from a logical name.

FIG. 4 is a flowchart of the steps taken by Timing and Simulation processing to obtain a gate level name from a logical state name. After Start Step 200, if a logical state name is referenced in either the Timing Notes or the Simulation Tests (Test Step 202), then Yes path 204 is taken to Step 206. At this step, the State Map is searched to find an entry for the referenced logical state name. Next, at Step 208, the gate level name mapped to the logical state name in the State Map entry is obtained. The gate level name is then used by Timing and Simulation software for further processing. Processing ends at End Step 210. If no logical state names are referenced, then No path 212 is taken to End Step 210. In this case, no special processing for mapping logical state names to gate level names is performed.

For illustrative purposes, Table I below shows a sample portion of a Behavior Description.

TABLE I

| H_BD_ACCESS_REG_PR | :STATE VECTOR[0 . . . 2] OF LOGICAL; |
|---|---|
| H_BD_ACCESS_REG_W | :STATE VECTOR[0 . . . 24] OF LOGICAL; |

In the Behavior Description fragment of Table I, two logical components are defined for an integrated circuit design. The logical name "H_BD_ACCESS_REG_PR" defines a state vector of three logical (i.e., boolean) values. This state vector represents a three bit access register in the integrated circuit design. The logical state name "H_BD_ACCESS_R" defines a state vector of 25 logical values. This state vector represents a 25-bit access register in the integrated circuit design. These registers were defined by the Circuit Designer 22 and captured by the Design Capture program 24. As the Synthesis program 28 processes the component definitions contained in the Behavior Description 26 and generates gate level names, entries are made in the State Map 44 to associate each component with a gate level name in the Detailed Description. Table II below shows the corresponding entries in the State Map file for these register transfer level definitions. Note that the State Map file has the simple format of "A"="B", where "A" is a register transfer level logical name and "B" is a gate level name.

The names on the left are the logical state names of components from the Behavior Description and the names on the right are the corresponding gate level names from the Detailed Description. Note how the Synthesis program 28 has expanded the three bit definition of the H_BD_ACCESS_REG_PR register into its three constituent bits. The Synthesis program also generated the Detailed Description name for each bit. For example, "H_BD_ACCESS_REG_PR[00]" in the Behavior Description has been mapped to the gate level name "BK0_SUBSET.H_BD_ACCESS_REG_PS[00]", "H_BD_ACCESS_REG_PR[01]" has been mapped to "BK_SUBSET.H_BD_ACCESS_REG_PS[01]", and so on. The corresponding State Map entry shows both names as equivalent to each other. Similarly, the H_BD_ACC_REG_R register has been expanded to its 25 constituent bits and the Synthesis program has generated the corresponding gate level names. One skilled in the programming art can easily see how the Timing and Simulation programs can be modified to search the State Map file for a logical state name referenced in a Timing Note or a Simulation Test and then exchange the logical state name for the corresponding gate level name. In this manner, all Timing Notes and Simulation Tests may be written in easy to understand, designer-specified, register transfer level names rather than artificially assigned gate level names. This advance fulfills the goals and objectives described above by reducing the time needed for timing and simulation test generation and modification.

The invention has been described in its presently contemplated best mode, and clearly it is susceptible to various modifications, modes of operation and embodiments, all

TABLE II

| H_BD_ACCESS_REG_PR[00] = BK0_SUBSET.H_BD_ACCESS_REG_PS[00] |
|---|
| H_BD_ACCESS_REG_PR[01] = BK0_SUBSET.H_BD_ACCESS_REG_PS[01] |
| H_BD_ACCESS_REG_PR[02] = BK0_SUBSET.H_BD_ACCESS_REG_PS[02] |
| H_BD_ACCESS_REG_R[00] = BK0_SUBSET.H_BD_ACCESS_REG_S[00] |
| H_BD_ACCESS_REG_R[01] = BK0_SUBSET.H_BD_ACCESS_REG_S[01] |
| H_BD_ACCESS_REG_R[02] = BK0_SUBSET.H_BD_ACCESS_REG_S[02] |
| H_BD_ACCESS_REG_R[03] = BK0_SUBSET.H_BD_ACCESS_REG_S[03] |
| H_BD_ACCESS_REG_R[04] = BK0_SUBSET.H_BD_ACCESS_REG_S[04] |
| H_BD_ACCESS_REG_R[05] = BK0_SUBSET.H_BD_ACCESS_REG_S[05] |
| H_BD_ACCESS_REG_R[06] = BK0_SUBSET.H_BD_ACCESS_REG_S[06] |
| H_BD_ACCESS_REG_R[07] = BK0_SUBSET.H_BD_ACCESS_REG_S[07] |
| H_BD_ACCESS_REG_R[08] = BK0_SUBSET.H_BD_ACCESS_REG_S[08] |
| H_BD_ACCESS_REG_R[09] = BK0_SUBSET.H_BD_ACCESS_REG_S[09] |
| H_BD_ACCESS_REG_R[10] = BK0_SUBSET.H_BD_ACCESS_REG_S[10] |
| H_BD_ACCESS_REG_R[11] = BK0_SUBSET.H_BD_ACCESS_REG_S[11] |
| H_BD_ACCESS_REG_R[12] = BK0_SUBSET.H_BD_ACCESS_REG_S[12] |
| H_BD_ACCESS_REG_R[13] = BK0_SUBSET.H_BD_ACCESS_REG_S[13] |
| H_BD_ACCESS_REG_R[14] = BK0_SUBSET.H_BD_ACCESS_REG_S[14] |
| H_BD_ACCESS_REG_R[15] = BK0_SUBSET.H_BD_ACCESS_REG_S[15] |
| H_BD_ACCESS_REG_R[16] = BK0_SUBSET.H_BD_ACCESS_REG_S[16] |
| H_BD_ACCESS_REG_R[17] = BK0_SUBSET.H_BD_ACCESS_REG_S[17] |
| H_BD_ACCESS_REG_R[18] = BK0_SUBSET.H_BD_ACCESS_REG_S[18] |
| H_BD_ACCESS_REG_R[19] = BK0_SUBSET.H_BD_ACCESS_REG_S[19] |
| H_BD_ACCESS_REG_R[20] = BK0_SUBSET.H_BD_ACCESS_REG_S[20] |
| H_BD_ACCESS_REG_R[21] = BK0_SUBSET.H_BD_ACCESS_REG_S[21] |
| H_BD_ACCESS_REG_R[22] = BK0_SUBSET.H_BD_ACCESS_REG_S[22] |
| H_BD_ACCESS_REG_R[23] = BK0_SUBSET.H_BD_ACCESS_REG_S[23] |
| H_BD_ACCESS_REG_R[24] = BK0_SUBSET.H_BD_ACCESS_REG_S[24] | within the ability and skill of those skilled in the art and without the exercise of further inventive activity. Accordingly, what is intended to be protected by Letters Patent is set forth in the appended claims.

We claim:

1. In a system for designing a circuit, the system including a first level description of the circuit design, the first level description referencing logical state names for the circuit's components and nets, a synthesis program taking as input the first level description and generating a second level description of the circuit design, the second level description referencing gate level state names for the circuit's components and nets, and a post-synthesis program for analyzing the design of the circuit, the post-synthesis program for processing a control file which references logical state names and for further processing the second level description, a computer-implemented method of using logical state names in a post-synthesis program comprising the steps of:
   (a) creating an electronic file for storing relationships between the logical state names specified in the first level description of the circuit design and the gate level state names specified in the second level description of the circuit design;
   (b) creating an entry in said electronic file for a logical state name specified in the first level description of the circuit design;
   (c) storing in said entry a gate level state name corresponding to said logical state name specified in the first level description;
   (d) repeating steps (b) and (c) for all logical state names in the first level description;
   (e) providing said electronic file to the post-synthesis program; and
   (f) automatically translating the references to logical state names in the control file into corresponding gate level state names by searching said electronic file for each of said logical state names in the control file and returning a corresponding gate level state name to the post-synthesis program.

2. The computer-implemented method of claim 1, further comprising the step of repeating steps (a) through (e) each time the first level description is modified.

3. The computer-implemented method of claim 1, further comprising the step of sorting said electronic file before inputting said electronic file to the post-synthesis program.

4. In an electronic design automation system for designing an integrated circuit, the electronic design automation system including a register transfer level description of the integrated circuit design, the register transfer level description referencing logical names of state for the integrated circuit's components, a synthesis program taking as input the register transfer level description and generating a gate level description of the integrated circuit design, the gate level description referencing gate level state names for the integrated circuit's components, a post-synthesis timing verification program for analyzing the timing of the integrated circuit design, the post-synthesis timing verification program taking as input a timing notes file and the gate level description, a computer-implemented method of using logical state names in a post-synthesis timing verification program comprising the steps of:
   (a) creating an electronic file for storing relationships between the logical names of states specified in the register transfer level description of the integrated circuit design and the gate level names of states specified in the gate level description of the integrated circuit design;
   (b) creating an entry in said electronic file for a logical state name specified in the register transfer level description of the integrated circuit design;
   (c) storing a gate level state name specified in the gate level description of the integrated circuit design corresponding to said logical state name specified in the register transfer level description into said entry;
   (d) repeating steps (b) and (c) for all logical state names in the register transfer level description;
   (e) inputting said electronic file to the post-synthesis timing verification program; and
   (f) automatically translating references to logical state names in the timing notes file into corresponding gate level state names by searching said electronic file for said entries representing said logical state names and returning said gate level state names stored in said entries to the post-synthesis timing verification program.

5. The computer-implemented method of claim 4, further comprising the step of sorting said electronic file before inputting said electronic file to the post-synthesis timing verification program.

6. In an electronic design automation system for designing an integrated circuit, the electronic design automation system including a register transfer level description of the integrated circuit design, the register transfer level description referencing logical state names for the integrated circuit's components and nets, the electronic design automation system further including a synthesis program taking as input the register transfer level description and generating a gate level description of the integrated circuit design, the gate level description referencing gate level state names for the integrated circuit's components and nets, the electronic design automation system still further including a post-synthesis simulation program for simulating the performance of the integrated circuit design, the post-synthesis simulation program taking as input a simulation test file and the gate level description, a computer-implemented method of using logical state names in a post-synthesis simulation program comprising the steps of:
   (a) creating an electronic file for storing relationships between the logical state names specified in the register transfer level description of the integrated circuit design and the gate level state names specified in the gate level description of the integrated circuit design;
   (b) creating an entry in said electronic file for a logical state name specified in the register transfer level description of the integrated circuit design;
   (c) storing a gate level state name specified in the gate level description of the integrated circuit design corresponding to said logical state name specified in the register transfer level description into said entry;
   (d) repeating steps (b) and (c) for all logical state names in the register transfer level description;
   (e) inputting said electronic file to the post-synthesis simulation program; and
   (f) automatically translating references to logical state names in the simulation test file into corresponding gate level state names by searching said electronic file for ones of said entries representing said references to logical state names in the simulation test file and returning said gate level state names stored in said ones of said entries to the post-synthesis simulation program.

7. The computer-implemented method of claim 6, further comprising the step of sorting said electronic file before providing said electronic file to the post-synthesis simulation program.

8. The computer-implemented method of claim 4 or claim 6, further comprising the step of repeating steps (a) through (e) each time the register transfer level description is modified.

9. An electronic design automation system for designing and testing an application specific integrated circuit (ASIC), including a design capture sub-system for generating a register transfer level description of the ASIC design based on a circuit designer's requests, the register transfer level description referencing logical names of states for the ASIC's components and nets, the electronic design automation system further including a synthesis sub-system for taking as input the register transfer level description and generating a gate level description of the ASIC design, the gate level description referencing gate level names of states for the ASIC's components, the electronic design automation system further including a post-synthesis timing sub-system for analyzing the timing of the ASIC design, the post-synthesis timing sub-system taking as input a timing notes file specified using gate level names of states and the gate level description, and the electronic design automation system still further including a post-synthesis simulation sub-system for simulating the performance of the ASIC, the post-synthesis simulation sub-system taking as input a simulation test file specified using gate level names of states and the gate level description, the electronic design automation system comprising:

a processor;

a storage device coupled to said processor;

a state map electronic file resident in said storage device for storing relationships between logical names of states specified in the register transfer level description of the ASIC design and the gate level names of states specified in the gate level description of the ASIC design; and software means operative on said processor for:
(a) creating entries in said state map electronic file, each of said entries for storing a logical name of a state specified in the register transfer level description of the ASIC design;
(b) storing into each of said entries a gate level name of a state specified in the gate level description of the ASIC design and corresponding to said logical name of a state specified in said entry;
(c) providing said state map electronic file to the post-synthesis timing sub-system and the post-synthesis simulation sub-system; and
(d) translating references to logical names of states in the timing notes file and the simulation test file into corresponding gate level names of states by searching said state map electronic file for ones of said entries representing logical names of states contained in said references and returning gate level names of state stored in said ones of said entries to the post-synthesis timing sub-system and the post-synthesis simulation sub-system.

10. A system for designing a circuit, the system including a first level description of the circuit design, the first level description referencing logical state names for the circuit's components and nets, a synthesis program taking as input the first level description and generating a second level description of the circuit design, the second level description referencing gate level state names for the circuit's components and nets, and a post-synthesis program for analyzing the design of the circuit, the post-synthesis program taking as input a control file and the second level description, the system comprising:

means for creating an electronic file for storing relationships between the logical state names specified in the first level description of the circuit design and the gate level state names specified in the second level description of the circuit design;

means for creating an entry in said electronic file for each logical state name specified in the first level description of the circuit design;

means for storing a gate level state name specified in the second level description of the circuit design corresponding to a logical state name specified in the first level description into said entry;

means for sorting said electronic file according to predetermined criteria;

means for providing said electronic file to the post-synthesis program; and means for automatically translating references made by the control file to logical state names into corresponding gate level state names by searching said electronic file for ones of said entries representing said references made by the control file to logical state names and returning from said ones of said entries said gate level state names to be provided to the post-synthesis program.

11. An electronic design automation system for designing an integrated circuit, the electronic design automation system including a register transfer level description of the integrated circuit design, the register transfer level description referencing logical state names for the integrated circuit's components, the electronic design automation system further including a synthesis program taking as input the register transfer level description and generating a gate level description of the integrated circuit design, the gate level description referencing gate level state names for the integrated circuit's components wherein predetermined ones of the gate level state names correspond to corresponding ones of the logical state names, the electronic design automation system further including a post-synthesis timing verification program for analyzing the timing of the integrated circuit design, the post-synthesis timing verification program taking as input a timing notes file and the gate level description, the electronic design automation system comprising:

means for creating an electronic file for storing relationships between the logical state names specified in the register transfer level description of the integrated circuit design and the gate level state names specified in the gate level description of the integrated circuit design;

means for creating an entry in said electronic file for each logical state name specified in the register transfer level description of the integrated circuit design;

means for storing a gate level state name specified in the gate level description of the integrated circuit design into an entry storing a corresponding logical state name;

means for sorting said electronic file according to predetermined criteria;

means for inputting said electronic file to the post-synthesis timing verification program; and means for automatically translating references to logical state names in the timing notes file into corresponding gate level state names by searching said electronic file for entries representing said references to logical state names in the timing notes file and returning to the post-synthesis timing verification program said gate level state names stored in said entries representing said references.

12. An electronic design automation system for designing an integrated circuit, the electronic design automation system including a register transfer level description of the integrated circuit design, the register transfer level description referencing logical state names for the integrated circuit's components and nets, the electronic design automation system including a synthesis program taking as input the register transfer level description and generating a gate level description of the integrated circuit design, the gate level description referencing gate level state names for the integrated circuit's components and nets, wherein each of said gate level state names corresponds to a corresponding one of said logical state names, and the electronic design automation system further including a post-synthesis simulation program for simulating the performance of the integrated circuit design, the post-synthesis simulation program taking as input a simulation test file and the gate level description, the electronic design automation system comprising:

- means for creating an electronic file for storing relationships between the logical state names specified in the register transfer level description of the integrated circuit design and the gate level state names specified in the gate level description of the integrated circuit design;
- means for creating an entry in said electronic file for each logical state name specified in the register transfer level description, each said entry for storing a different one of the logical state names included in the integrated circuit design;
- means for storing a gate level state name specified in the gate level description of the integrated circuit design into an entry for the corresponding logical state name;
- means for sorting said entries of said electronic file according to predetermined criteria;
- means for providing said electronic file to the post-synthesis simulation program; and
- means for automatically translating references to logical state names in the simulation file into corresponding gate level state names by searching said electronic file for selected ones of said entries that store logical state names referenced in the simulation file and returning gate level state names stored in said selected ones of said entries to the post-synthesis simulation program.

13. An electronic design automation system for designing an application specific integrated circuit (ASIC), the electronic design automation system including a design capture program for generating a register transfer level description of the ASIC design, the register transfer level description referencing logical state names for the ASIC's components, the electronic design automation system further including a synthesis program taking as input the register transfer level description and generating a gate level description of the ASIC design, the gate level description referencing gate level state names for the integrated circuit's components, the electronic design automation system further including a post-synthesis timing program for analyzing the timing of the ASIC design, the post-synthesis timing program taking as input a timing notes file and the gate level description, and a post-synthesis simulation program for simulating the performance of the ASIC, the post-synthesis simulation program taking as input a simulation test file and the gate level description, the electronic design automation system comprising:

- means for creating an electronic file for storing relationships between the logical state names specified in the register transfer level description of the ASIC design and the gate level state names specified in the gate level description of the ASIC design;
- means for creating an entry in said electronic file for each logical state name specified in the register transfer level description of the ASIC design;
- means for storing a gate level state name specified in the gate level description of the ASIC design corresponding to a logical state name specified in the register transfer level description into said entry;
- means for sorting said electronic file according to predetermined criteria;
- means for inputting said electronic file to the post-synthesis timing program and the post-synthesis simulation program; and
- means for automatically translating references to logical state names in the timing notes file and the simulation test file into corresponding gate level state names by searching said electronic file for said entries representing said logical state names and returning said gate level state names stored in said entries.

* * * * *